United States Patent
Chen et al.

(10) Patent No.: US 10,310,951 B1
(45) Date of Patent: Jun. 4, 2019

(54) STORAGE SYSTEM ASYNCHRONOUS DATA REPLICATION CYCLE TRIGGER WITH EMPTY CYCLE DETECTION

(71) Applicant: EMC Corporation, Hopkinton, MA (US)

(72) Inventors: Xiangping Chen, Sherborn, MA (US); David Meiri, Cambridge, MA (US); Alexandr Veprinsky, Brookline, MA (US); Anton Kucherov, Milford, MA (US); Philip Love, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 399 days.

(21) Appl. No.: 15/076,775

(22) Filed: Mar. 22, 2016

(51) Int. Cl.
| | | |
|---|---|---|
| *G06F 7/00* | (2006.01) | |
| *G06F 17/00* | (2019.01) | |
| *G06F 11/14* | (2006.01) | |
| *G06F 16/27* | (2019.01) | |
| *G06F 16/182* | (2019.01) | |
| *G06F 16/18* | (2019.01) | |

(52) U.S. Cl.
CPC ...... *G06F 11/1469* (2013.01); *G06F 16/1844* (2019.01); *G06F 16/1873* (2019.01); *G06F 16/273* (2019.01); *G06F 2212/261* (2013.01)

(58) Field of Classification Search
None
See application file for complete search history.

(56) References Cited

U.S. PATENT DOCUMENTS

| | | |
|---|---|---|
| 4,164,763 A | 8/1979 | Briccetti et al. |
| 4,608,839 A | 9/1986 | Tibbals, Jr. |
| | (Continued) | |

FOREIGN PATENT DOCUMENTS

| | | |
|---|---|---|
| EP | 1804157 | 7/2007 |
| WO | WO 2010/019596 | 2/2010 |
| | (Continued) | |

OTHER PUBLICATIONS

U.S. Non-Final Office Action dated Jan. 11, 2018 corresponding to U.S. Appl. No. 15/085,168; 14 Pages.

(Continued)

*Primary Examiner* — Tuan A Pham
(74) *Attorney, Agent, or Firm* — Daly, Crowley, Mofford & Durkee, LLP

(57) ABSTRACT

Described embodiments provide systems and processes for performing a data replication process in a storage system. A current asynchronous replication cycle is initiated at a time-based interval based upon a replication policy of the storage system to replicate data from at least one source device to at least one target device. For the current asynchronous replication cycle, it is determined whether data stored on portions of the source device has changed from a previous asynchronous replication cycle. A new replica of the source device is generated if data stored on the source device has changed from the previous asynchronous replication cycle. The new replica is transferred to the target device. The current asynchronous replication cycle is completed and the replication policy of the storage system is satisfied without generating the new replica if data stored on the source device has not changed from the previous asynchronous replication cycle.

11 Claims, 5 Drawing Sheets

(56) References Cited

U.S. PATENT DOCUMENTS

| | | | |
|---|---|---|---|
| 4,821,178 A | 4/1989 | Levin et al. | |
| 5,319,645 A | 6/1994 | Bassi et al. | |
| 5,537,534 A | 7/1996 | Voigt et al. | |
| 5,539,907 A | 7/1996 | Srivastava et al. | |
| 5,627,905 A | 5/1997 | Miller et al. | |
| 5,710,724 A | 1/1998 | Burrows | |
| 5,732,273 A | 3/1998 | Srivastava et al. | |
| 5,860,137 A | 1/1999 | Raz et al. | |
| 5,896,538 A | 4/1999 | Blandy et al. | |
| 5,903,730 A | 5/1999 | Asai et al. | |
| 5,940,618 A | 8/1999 | Blandy et al. | |
| 5,940,841 A | 8/1999 | Schmuck et al. | |
| 5,987,250 A | 11/1999 | Subrahmanyam | |
| 5,999,842 A | 12/1999 | Harrison et al. | |
| 6,182,086 B1 | 1/2001 | Lomet et al. | |
| 6,226,787 B1 | 5/2001 | Serra et al. | |
| 6,327,699 B1 | 12/2001 | Larus et al. | |
| 6,353,805 B1 | 3/2002 | Zahir et al. | |
| 6,470,478 B1 | 10/2002 | Bargh et al. | |
| 6,519,766 B1 | 2/2003 | Barritz et al. | |
| 6,643,654 B1 | 11/2003 | Patel et al. | |
| 6,654,948 B1 | 11/2003 | Konuru et al. | |
| 6,658,471 B1 | 12/2003 | Berry et al. | |
| 6,658,654 B1 | 12/2003 | Berry et al. | |
| 6,801,914 B2 | 10/2004 | Barga et al. | |
| 6,820,218 B1 | 11/2004 | Barga et al. | |
| 6,870,929 B1 | 3/2005 | Greene | |
| 7,099,797 B1 | 8/2006 | Richard | |
| 7,143,410 B1 | 11/2006 | Coffman et al. | |
| 7,251,663 B1 | 7/2007 | Smith | |
| 7,315,795 B2 | 1/2008 | Homma | |
| 7,389,497 B1 | 6/2008 | Edmark et al. | |
| 7,421,681 B2 | 9/2008 | DeWitt, Jr. et al. | |
| 7,552,125 B1 | 6/2009 | Evans | |
| 7,574,587 B2 | 8/2009 | DeWitt, Jr. et al. | |
| 7,672,005 B1 | 3/2010 | Hobbs et al. | |
| 7,693,999 B2 | 4/2010 | Park | |
| 7,714,747 B2 | 5/2010 | Fallon | |
| 7,814,218 B1 | 10/2010 | Knee et al. | |
| 7,827,136 B1 | 11/2010 | Wang et al. | |
| 7,908,436 B1 | 3/2011 | Srinivasan et al. | |
| 8,117,235 B1 * | 2/2012 | Barta | G06F 3/0607 707/635 |
| 8,200,923 B1 | 6/2012 | Healey et al. | |
| 8,478,951 B1 | 7/2013 | Healey et al. | |
| 8,874,863 B2 * | 10/2014 | Mutalik | G06F 17/30162 711/162 |
| 9,037,822 B1 | 5/2015 | Meiri et al. | |
| 9,104,326 B2 | 8/2015 | Frank et al. | |
| 9,128,942 B1 | 9/2015 | Pfau et al. | |
| 9,208,162 B1 | 12/2015 | Hallak et al. | |
| 9,270,592 B1 | 2/2016 | Sites | |
| 9,286,003 B1 | 3/2016 | Hallak et al. | |
| 9,304,889 B1 | 4/2016 | Chen et al. | |
| 9,330,048 B1 | 5/2016 | Bhatnagar et al. | |
| 9,342,465 B1 | 5/2016 | Meiri | |
| 9,378,106 B1 | 6/2016 | Ben-Moshe et al. | |
| 9,396,243 B1 | 7/2016 | Halevi et al. | |
| 9,418,131 B1 | 8/2016 | Halevi et al. | |
| 9,762,460 B2 | 9/2017 | Pawlowski et al. | |
| 9,769,254 B2 | 9/2017 | Gilbert et al. | |
| 9,785,468 B2 | 10/2017 | Mitchell et al. | |
| 2002/0056031 A1 | 5/2002 | Skiba et al. | |
| 2002/0133512 A1 | 9/2002 | Milillo et al. | |
| 2003/0023656 A1 | 1/2003 | Hutchison et al. | |
| 2003/0079041 A1 | 4/2003 | Parrella, Sr. et al. | |
| 2003/0126122 A1 | 7/2003 | Bosley et al. | |
| 2003/0145251 A1 | 7/2003 | Cantrill | |
| 2004/0030721 A1 | 2/2004 | Kruger et al. | |
| 2004/0267835 A1 | 12/2004 | Zwilling et al. | |
| 2005/0039171 A1 | 2/2005 | Avakian et al. | |
| 2005/0102547 A1 | 5/2005 | Keeton et al. | |
| 2005/0125626 A1 | 6/2005 | Todd | |
| 2005/0144416 A1 | 6/2005 | Lin | |
| 2005/0171937 A1 | 8/2005 | Hughes et al. | |
| 2005/0177603 A1 | 8/2005 | Shavit | |
| 2005/0193084 A1 | 9/2005 | Todd et al. | |
| 2005/0278346 A1 | 12/2005 | Shang et al. | |
| 2006/0031653 A1 * | 2/2006 | Todd | G06F 3/0622 711/170 |
| 2006/0031787 A1 | 2/2006 | Ananth et al. | |
| 2006/0047776 A1 | 3/2006 | Chieng et al. | |
| 2006/0070076 A1 | 3/2006 | Ma | |
| 2006/0123212 A1 | 6/2006 | Yagawa | |
| 2006/0242442 A1 | 10/2006 | Armstrong et al. | |
| 2007/0078982 A1 | 4/2007 | Aidun et al. | |
| 2007/0206788 A1 | 9/2007 | Hagiwara et al. | |
| 2007/0276885 A1 * | 11/2007 | Valiyaparambil | G06F 11/1451 |
| 2007/0297434 A1 | 12/2007 | Arndt et al. | |
| 2008/0098183 A1 | 4/2008 | Morishita et al. | |
| 2008/0163215 A1 | 7/2008 | Jiang et al. | |
| 2008/0178050 A1 | 7/2008 | Kern et al. | |
| 2008/0243952 A1 | 10/2008 | Webman et al. | |
| 2008/0288739 A1 | 11/2008 | Bamba et al. | |
| 2009/0006745 A1 | 1/2009 | Cavallo et al. | |
| 2009/0030986 A1 | 1/2009 | Bates | |
| 2009/0049450 A1 | 2/2009 | Dunshea et al. | |
| 2009/0055613 A1 | 2/2009 | Maki et al. | |
| 2009/0089483 A1 | 4/2009 | Tanaka et al. | |
| 2009/0100108 A1 | 4/2009 | Chen et al. | |
| 2009/0222596 A1 | 9/2009 | Flynn et al. | |
| 2009/0319996 A1 | 12/2009 | Shafi et al. | |
| 2010/0042790 A1 | 2/2010 | Mondal et al. | |
| 2010/0088296 A1 | 4/2010 | Periyagaram et al. | |
| 2010/0180145 A1 | 7/2010 | Chu | |
| 2010/0199066 A1 | 8/2010 | Artan et al. | |
| 2010/0205330 A1 | 8/2010 | Noborikawa et al. | |
| 2010/0223619 A1 | 9/2010 | Jaquet et al. | |
| 2010/0257149 A1 | 10/2010 | Cognigni et al. | |
| 2011/0060722 A1 | 3/2011 | Li et al. | |
| 2011/0078494 A1 | 3/2011 | Maki et al. | |
| 2011/0083026 A1 | 4/2011 | Mikami et al. | |
| 2011/0099342 A1 * | 4/2011 | Ozdemir | G06F 11/2066 711/162 |
| 2011/0119679 A1 | 5/2011 | Muppirala et al. | |
| 2011/0161297 A1 | 6/2011 | Parab | |
| 2011/0202744 A1 | 8/2011 | Kulkarni et al. | |
| 2011/0225122 A1 | 9/2011 | Denuit et al. | |
| 2011/0289291 A1 | 11/2011 | Agombar et al. | |
| 2012/0054472 A1 | 3/2012 | Altman et al. | |
| 2012/0059799 A1 | 3/2012 | Oliveira et al. | |
| 2012/0078852 A1 | 3/2012 | Haselton et al. | |
| 2012/0124282 A1 | 5/2012 | Frank et al. | |
| 2012/0158736 A1 | 6/2012 | Milby | |
| 2012/0203742 A1 * | 8/2012 | Goodman | G06F 11/1451 707/646 |
| 2012/0278793 A1 | 11/2012 | Jalan et al. | |
| 2012/0290546 A1 | 11/2012 | Smith et al. | |
| 2012/0290798 A1 | 11/2012 | Huang et al. | |
| 2012/0304024 A1 | 11/2012 | Rohleder et al. | |
| 2013/0031077 A1 | 1/2013 | Liu et al. | |
| 2013/0054524 A1 | 2/2013 | Anglin et al. | |
| 2013/0073527 A1 | 3/2013 | Bromley | |
| 2013/0110783 A1 | 5/2013 | Wertheimer et al. | |
| 2013/0111007 A1 | 5/2013 | Hoffmann et al. | |
| 2013/0138607 A1 | 5/2013 | Bashyam et al. | |
| 2013/0151683 A1 | 6/2013 | Jain et al. | |
| 2013/0151759 A1 | 6/2013 | Shim et al. | |
| 2013/0198854 A1 | 8/2013 | Erway et al. | |
| 2013/0246354 A1 | 9/2013 | Clayton et al. | |
| 2013/0246724 A1 | 9/2013 | Furuya | |
| 2013/0265883 A1 | 10/2013 | Henry et al. | |
| 2013/0282997 A1 | 10/2013 | Suzuki et al. | |
| 2013/0318051 A1 | 11/2013 | Kumar et al. | |
| 2013/0332610 A1 | 12/2013 | Beveridge | |
| 2013/0339533 A1 | 12/2013 | Neerincx et al. | |
| 2014/0032964 A1 | 1/2014 | Neerincx et al. | |
| 2014/0040199 A1 | 2/2014 | Golab et al. | |
| 2014/0040343 A1 | 2/2014 | Nickolov et al. | |
| 2014/0136759 A1 | 5/2014 | Sprouse et al. | |
| 2014/0143206 A1 | 5/2014 | Pittelko | |
| 2014/0161348 A1 | 6/2014 | Sutherland et al. | |
| 2014/0195484 A1 | 7/2014 | Wang et al. | |
| 2014/0237201 A1 | 8/2014 | Swift | |

(56) References Cited

U.S. PATENT DOCUMENTS

| | | |
|---|---|---|
| 2014/0297588 A1 | 10/2014 | Babashetty et al. |
| 2014/0359231 A1 | 12/2014 | Matthews |
| 2014/0380282 A1 | 12/2014 | Ravindranath Sivalingam et al. |
| 2015/0006910 A1 | 1/2015 | Shapiro |
| 2015/0088823 A1 | 3/2015 | Chen et al. |
| 2015/0112933 A1 | 4/2015 | Satapathy |
| 2015/0149739 A1 | 5/2015 | Seo et al. |
| 2015/0161194 A1* | 6/2015 | Provenzano ...... G06F 17/30371 707/690 |
| 2015/0205816 A1 | 7/2015 | Periyagaram et al. |
| 2015/0249615 A1 | 9/2015 | Chen et al. |
| 2015/0324236 A1 | 11/2015 | Gopalan et al. |
| 2015/0363282 A1* | 12/2015 | Rangasamy ........ G06F 11/2033 714/4.12 |
| 2016/0034692 A1 | 2/2016 | Singler |
| 2016/0042285 A1 | 2/2016 | Gilenson et al. |
| 2016/0062853 A1 | 3/2016 | Sugabrahmam et al. |
| 2016/0080482 A1 | 3/2016 | Gilbert et al. |
| 2016/0188419 A1 | 6/2016 | Dagar et al. |
| 2016/0350391 A1 | 12/2016 | Vijayan et al. |
| 2016/0359968 A1 | 12/2016 | Chitti et al. |
| 2016/0366206 A1 | 12/2016 | Shemer et al. |
| 2017/0123704 A1 | 5/2017 | Sharma et al. |
| 2017/0139786 A1 | 5/2017 | Simon et al. |
| 2017/0161348 A1 | 6/2017 | Araki et al. |

FOREIGN PATENT DOCUMENTS

| | | |
|---|---|---|
| WO | WO 2010/040078 | 4/2010 |
| WO | WO 2012/066528 | 5/2012 |

OTHER PUBLICATIONS

U.S. Non-Final Office Action dated Dec. 29, 2017 corresponding to U.S. Appl. No. 15/196,674; 34 Pages.
U.S. Non-Final Office Action dated Jan. 8, 2018 corresponding to U.S. Appl. No. 15/196,472; 16 Pages.
U.S. Notice of Allowance dated Jan. 26, 2018 corresponding to U.S. Appl. No. 15/085,172; 8 Pages.
U.S. Notice of Allowance dated Jan. 24, 2018 corresponding to U.S. Appl. No. 15/085,181; 8 Pages.
Response to U.S. Non-Final Office Action dated Nov. 1, 2017 corresponding to U.S. Appl. No. 15/196,374; Response Filed Jan. 30, 2018; 14 Pages.
Office Action dated Nov. 1, 2017 corresponding to U.S. Appl. No. 15/196,374, 64 Pages.
U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 15/085,168, filed Mar. 30, 2016, Meiri et al.
U.S. Appl. No. 15/076,946, filed Mar. 22, 2016, Meiri.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri et al.
PCT International Search Report and Written Opinion dated Dec. 1, 2011 for PCT Application No. PCT/IL2011/000692; 11 Pages.
PCT International Preliminary Report dated May 30, 2013 for PCT Patent Application No. PCT/IL2011/000692; 7 Pages.
U.S. Appl. No. 12/945,915.
Nguyen et al., "B+ Hash Tree; Optimizing Query Execution Times for on-Disk Semantic Web Data Structures;" Proceedings of the 6th International Workshop on Scalable Semantic Web Knowledge Base Systems; Shanghai, China, Nov. 8, 2010; 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed on Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding to U.S. Appl. No. 14/034,961; 28 Pages.
Response to Office Action dated Jul. 22, 2015 corresponding to U.S. Appl. No. 14/034,981; Response filed on Dec. 22, 2015; 14 Pages.
Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed on Jan. 14, 2016; 10 Pages.
Restriction Requirement dated Sep. 24, 2015 corresponding to U.S. Appl. No. 14/230,405, 8 Pages.
Response to Restriction Requirement dated Sep. 24, 2015 corresponding to U.S. Appl. No. 14/230,405;Response filed Oct. 6, 2015; 1 Page.
Office Action dated Dec. 1, 2015 corresponding to U.S. Appl. No. 14/230,405; 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 14/494,899; 19 Pages.
Notice of Allowance dated Feb. 26, 2016 corresponding to U.S. Appl. No. 14/230,414; 8 Pages.
Final Office Action dated Apr. 6, 2016 corresponding to U.S. Appl. No. 14/034,981; 38 Pages.
U.S. Non-Final Office Action dated Jul. 6, 2017 for U.S. Appl. No. 14/494,895; 36 Pages.
U.S. Non-Final Office Action dated Dec. 1, 2017 for U.S. Appl. No. 14/979,890; 10 Pages.
U.S. Non-Final Office Action dated Dec. 11, 2017 for U.S. Appl. No. 15/196,447; 54 Pages.
U.S. Non-Final Office Action dated Dec. 14, 2017 for U.S. Appl. No. 15/076,946; 28 Pages.
Response to U.S. Non-Final Office Action dated Jul. 6, 2017 for U.S. Appl. No. 14/494,895; Response filed Oct. 3, 2017; 10 Pages.
Response filed on May 2, 2016 to the Non-Final Office Action dated Dec. 1, 2015; for U.S. Appl. No. 14/230,405; 8 pages.
Response filed on May 2, 2016 to the Non-Final Office Action dated Feb. 4, 2016; for U.S. Appl. No. 14/037,577; 10 pages.
U.S. Final Office Action dated Nov. 2, 2017 for U.S Appl. No. 14/494,895; 12 Pages.
Response to U.S. Non-Final Office Action dated Jan. 11, 2018 for U.S. Appl. No. 15/085,168; Response Filed on Apr. 5, 2018; 9 pages.
U.S. Notice of Allowance dated Feb. 21, 2018 for U.S. Appl. No. 15/196,427; 31 Pages.
Response to U.S. Final Office Action dated Apr. 6, 2016 corresponding to U.S. Appl. No. 14/034,981; Response filed on Jun. 16, 2016; 11 Pages.
Notice of Allowance dated Jun. 29, 2016 corresponding to U.S. Appl. No. 14/034,981; 14 Pages.
Notice of Allowance dated May 20, 2016 corresponding to U.S. Appl. No. 14/037,577; 19 Pages.
Notice of Allowance dated Jun. 6, 2016 corresponding to U.S. Appl. No. 14/317,449; 43 Pages.
U.S. Appl. No. 15/196,674, filed Jun. 29, 2016, Kleiner et al.
U.S. Appl. No. 15/196,427, filed Jun. 29, 2016, Shveidel.
U.S. Appl. No. 15/196,374, filed Jun. 29, 2016, Shveidel, et al.
U.S. Appl. No. 15/196,447, filed Jun. 29, 2016, Shveidel, et al.
U.S. Appl. No. 15/196,472, filed Jun. 29, 2016, Shveidel.
U.S. Notice of Allowance dated Jun. 28, 2018 for U.S. Appl. No. 15/085,168; 7 Pages.

* cited by examiner

200

STORAGE SYSTEM ASYNCHRONOUS DATA REPLICATION CYCLE TRIGGER WITH EMPTY CYCLE DETECTION

BACKGROUND

Computer data is increasingly vital to modern organizations, and protecting against data loss in the event of a system failure is an increasingly important organization objective. Data protection systems for storing organizational source (e.g., production) site data on a periodic basis suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself is both time consuming and can consume system resources.

Some data protection systems use data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for performing a data replication process in a storage system. A current asynchronous replication cycle may be initiated at a time-based interval based upon a replication policy of the storage system to replicate data from at least one source device to at least one target device. For the current asynchronous replication cycle, it may be determined whether data stored on portions of the source device has changed from a previous asynchronous replication cycle. A new replica of the source device may be generated if data stored on the source device has changed from the previous asynchronous replication cycle. The new replica may be transferred to the target device. The current asynchronous replication cycle may be completed and the replication policy of the storage system may be satisfied without generating the new replica if data stored on the source device has not changed from the previous asynchronous replication cycle.

Another aspect may provide a system including a processor and memory that stores computer program code that when executed on the processor may cause the processor to execute a data replication process associated with at least one source device and at least one target device in a storage system. The processor may perform the operations of initiating a current asynchronous replication cycle at a time-based interval based upon a replication policy of the storage system. For the current asynchronous replication cycle, it may be determined whether data stored on portions of the source device has changed from a previous asynchronous replication cycle. A new replica of the source device may be generated if data stored on the source device has changed from the previous asynchronous replication cycle. The new replica may be transferred to the target device. The current asynchronous replication cycle may be completed and the replication policy of the storage system may be satisfied without generating the new replica if data stored on the source device has not changed from the previous asynchronous replication cycle.

Another aspect may provide a computer program product including a non-transitory computer readable storage medium having computer program code encoded thereon that when executed on a processor of a computer may cause the computer to execute a data replication process associated with at least one source device and at least one target device in a storage system. The computer program product may include computer program code for initiating a current asynchronous replication cycle at a time-based interval based upon a replication policy of the storage system. For the current asynchronous replication cycle, the computer program product may include computer program code for determining whether data stored on portions of the source device has changed from a previous asynchronous replication cycle. The computer program product may include computer program code for generating a new replica of the source device if data stored on the source device has changed from the previous asynchronous replication cycle. The computer program product may include computer program code for transferring the new replica to the target device. The computer program product may include computer program code for completing the current asynchronous replication cycle and satisfying the replication policy of the storage system without generating the new replica if data stored on the source device has not changed from the previous asynchronous replication cycle.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
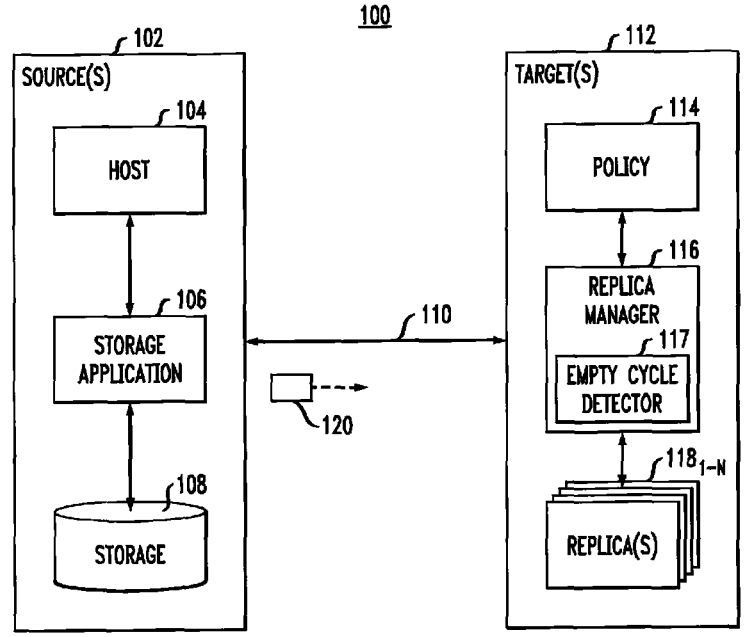
FIG. 1 is a block diagram of an example of a storage system to perform data replication from a source to a target in accordance with an illustrative embodiment.

FIG. 1 shows an example storage system 100. In accordance with illustrative embodiments, storage system 100 may perform time-based asynchronous data replication cycles without generating or transmitting replicas for "empty" data replication cycles where data stored on a source (e.g., production) volume was not modified in the time between replication cycles.

Storage system 100 may include at least one source site 102 and at least one target site 112, which may be co-located or geographically separated. Source site 102 may include host 104, storage application 106, and storage 108. In some embodiments, storage 108 may include one or more storage volumes (not shown), that operate as active or production volumes. Target site 112 may include replica manager 116 that manages a plurality of replicas $118_{1-N}$ (generally referred to herein as replicas 118) according to a policy 114 (e.g., a replication and/or retention policy). In some embodiments, replica manager 116 may include empty cycle detector 117 to detect empty data replication cycles.

Host 104 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from host 104, or over time as storage system 100 operates, storage application 106 may perform data replication 120 from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, target site 112 may include internal (e.g., short distance) communication links (not shown) to transfer data between storage volumes for storing replicas $118_{1-N}$, such as an InfiniBand (IB) link or Fibre Channel (FC) link.

In illustrative embodiments, storage system 100 may employ a snapshot (or replication) mechanism to replicate data between source site 102 and target site 112. A replica (or snapshot) may be created from data within storage 108 and transferred to one or more target sites 112 during a data replication cycle by data replication 120. Data replication 120 may be performed based on data replication policies that may define various settings for data recovery operations, shown as policy 114. For example, policy 114 may define a plurality of attributes, such as a frequency with which replicas are generated and how long each replica 118 is kept at target site 112. Policy 114 may also define a remote replica lag (e.g., the length of time during which updates may be lost in case of a source site failure), a recovery point objective (RPO) (e.g., a maximum acceptable lag time between the time data is committed to the source site 102 and the time the data is committed to the target site 112 or an acceptable amount of data loss measured in time), a recovery time objective (RTO) (e.g., the time taken to perform the recovery), the mode of replication (e.g., synchronous, asynchronous, continuous data protection (CDP), point in time (PIT), and so forth), and/or other attributes.

As described herein, in example embodiments, data replication 120 may be asynchronous data replication performed at time-based intervals during operation of storage system 100. The timing of asynchronous replication cycles and the retention of the replicas 118 may be managed by replica manager 116 of target site 112. Data replication 120 may alternatively be synchronous data replication performed when data is changed on source site 102.

For example, asynchronous data replication may periodically generate snapshots (or replicas), scan and compare the snapshots to determine changes in data between the snapshots, and transfer the data difference to target site 112. The frequency with which to perform replication cycles may be determined by a recovery point objective (RPO) and/or retention policy settings of policy 114. For example, policy 114 may define an RPO setting of x seconds, where x may be a positive integer, to ensure that the most recent available replica 118 stored on target site 112 reflects the state of data stored on source site 102 no longer than x seconds ago. Policy 114 may also determine how many replicas 118 should be maintained, at what time (e.g., what time of day, week, month, etc.), and for what duration.

In illustrative embodiments, policy 114 may set the RPO to a relatively short duration (e.g., on the order of 1 or 2 seconds) between asynchronous data replication cycles. With short RPO settings, however, at least some of the asynchronous replication cycles may be "empty," meaning that data stored on source site 102 (e.g., a source and/or production volume) was not modified in the time between replication cycles. Empty replication cycles, thus, may not have data that needs be replicated and transferred to target site 112, as no data was modified since the previous replica 118 was created and the previous replica 118 therefore contains the most current data.

Illustrative embodiments may employ empty cycle detector 117 to reduce or, ideally, eliminate, empty replication cycles. Empty cycle detector 117 may consider the retention policy and the RPO settings (e.g., policy 114), and also data changes to data stored on the source site 102 production volume of storage 108. If there is no data change since the previous replication cycle, then the replica (or snapshot) 118 created the previous replication cycle still reflects current data stored on the source volume. The "snapset" (e.g., the relationship between the source volume and the previous replica) on the source site 102 and the target site 112 may be updated to reflect a new timestamp of the previous replica 118, such that the RPO is not violated even though a new replica was not created and transferred.

Some described embodiments may employ empty cycle detector 117 to provide improved resource sharing and utilization by reducing the number of replicas created and transferred (e.g., reducing or eliminating empty replication cycles). Empty cycle detector 117 may also reduce unnecessary resource allocation and consumption. For example, reducing or eliminating empty replication cycles may reduce the memory and processing resources consumed to create and store unneeded replicas (e.g., replicas where no data was changed), and decrease the amount of communication link 110 consumed to transfer unneeded replicas from source site 102 to target site 112.

Figure 2:
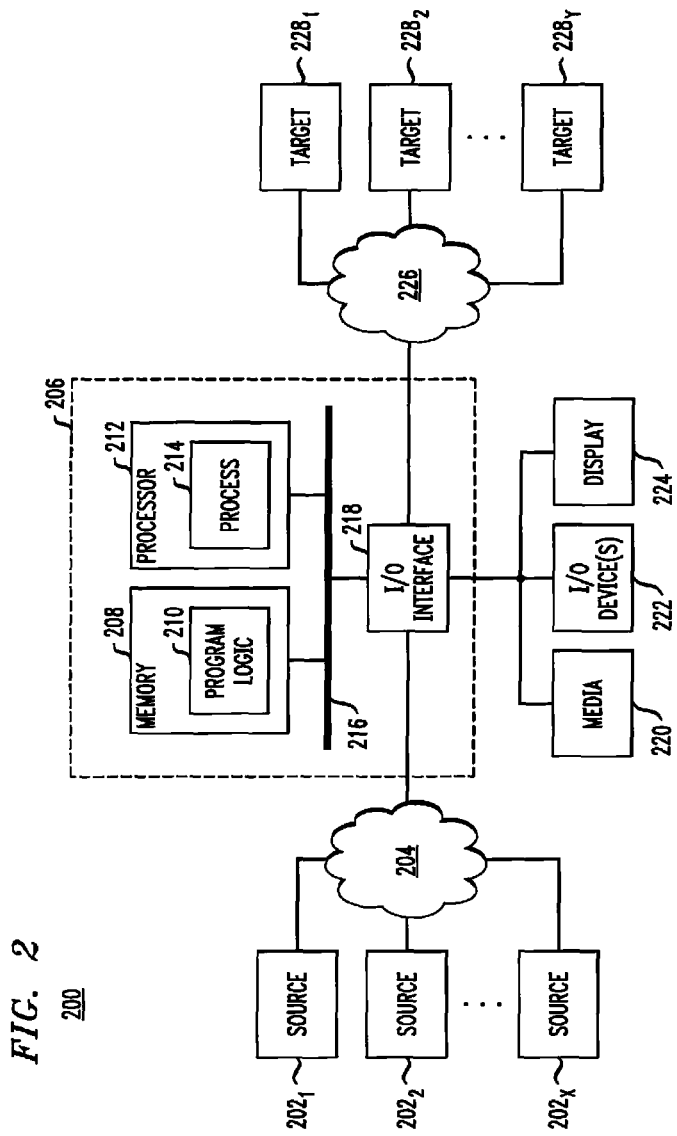
FIG. 2 is a block diagram of another example of a storage system to perform data replication from a source to a target in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices 228₁-228ᵧ via network 226. In some embodiments, network 226 of FIG. 2 may be a communication fabric between volumes of targets 228. For example, in some embodiments, network 226 may be an InfiniBand (IB) network or a Fibre Channel (FC) network. Further, in an illustrative embodiment, apparatus 206 may be implemented as part of host 104 of FIG. 1.

Figure 3:
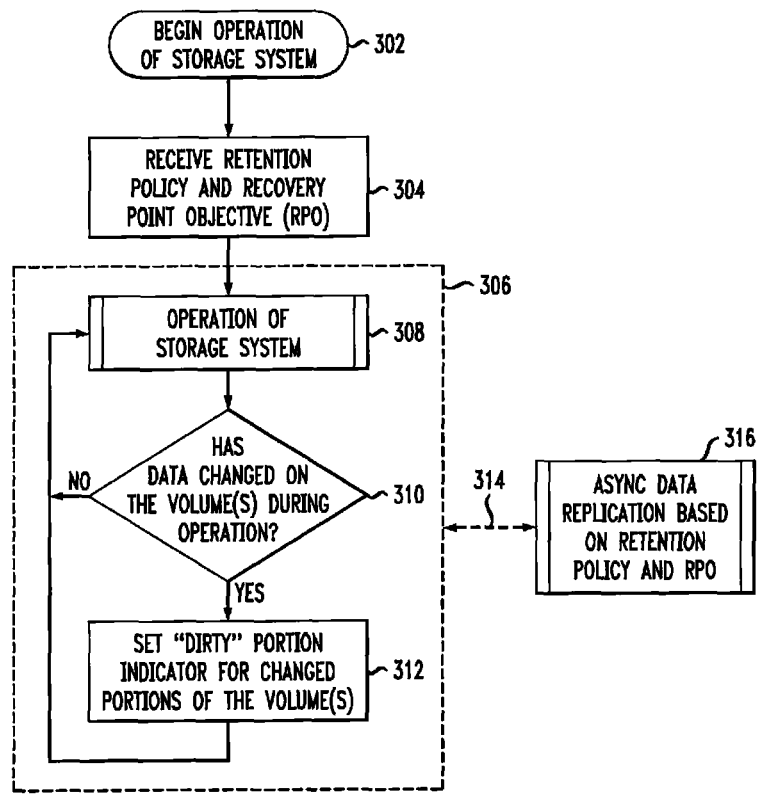
FIG. 3 is a flow diagram of an example of a process to perform data replication from a source to a target in accordance with an illustrative embodiment.

Referring to FIG. 3, process 300 is an example of a process to operate at least part of storage system 100 in accordance with illustrative embodiments. At block 302, operation of storage system 100 begins, for example when storage system 100 is first powered on. At block 304, storage system 100 may receive the retention policy and the recovery point objective (RPO), for example as set by a user of storage system 100 in policy 114. At block 308, storage system 100 operates, for example by performing host read operations from and host write operations to one or more volumes of storage 108. At block 310, as data on the volumes of storage 108 is modified, corresponding flags or indicators may be set at block 312 to indicate that the data has been modified since a previous data replication cycle (e.g., that the data is "dirty"). If, at block 310, data is not modified, flags or indicators are not set, and operation of storage system 100 continues at block 308. In an illustrative embodiment, the flags or indicators may be stored in a matrix or bitmap, for example, with each flag or indicator corresponding to a determined storage unit (or "slice") of each volume of storage 108. For example, in an embodiment, a slice may be a certain number of blocks or pages of a volume of storage 108. The flags or indicators may be stored in static memory of storage system 100, for example on storage 108.

As indicated by dashed block 306, blocks 308, 310 and 312 may be performed one or more times before an asynchronous data replication operation is performed at block 316. As indicated by dashed line 314, block 306 and block 316 may be performed in parallel during operation of storage system 100. As described herein, the timing of performing asynchronous data replication 316 may be determined, at least in part, by settings of the retention policy 114 and RPO received at block 304. Block 306 may operate continuously, with block 316 operating periodically, during operation of storage system 100. Asynchronous data replication operation 316 will be described in greater detail in conjunction with FIG. 4.

Figure 4:
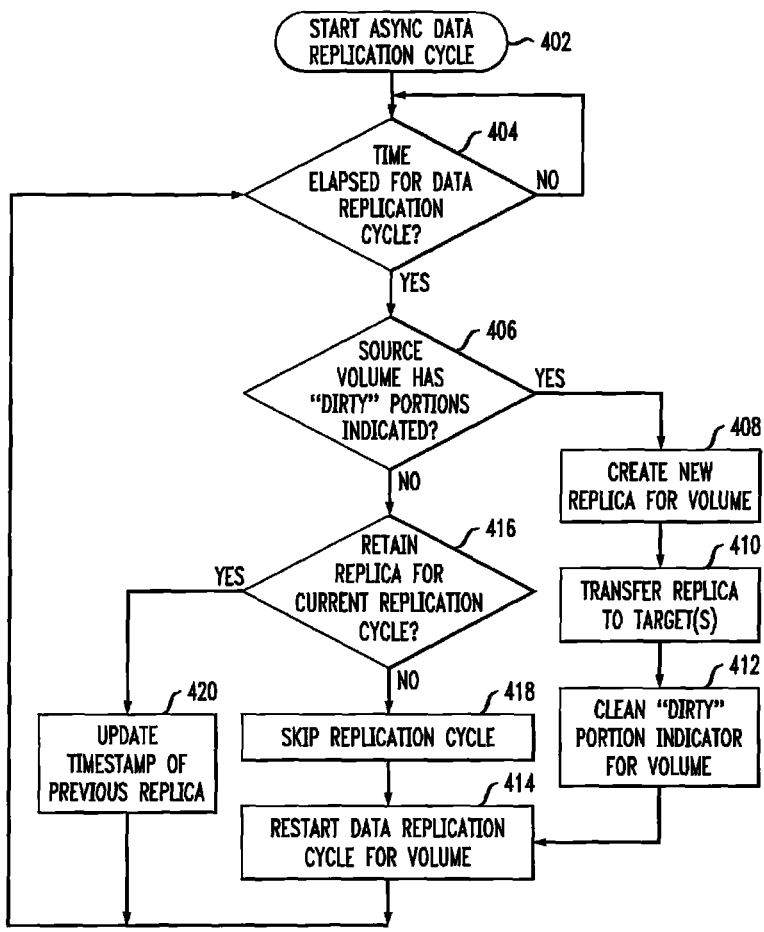
FIG. 4 is a flow diagram of an example of a process to perform asynchronous data replication from a source to a target in accordance with an illustrative embodiment.

Referring to FIG. 4, process 316' is an example of a process to perform at least part of an asynchronous data replication operation in accordance with illustrative embodiments. At block 402, asynchronous data replication operation 316' starts. At block 404, storage system 100 may check whether a particular amount of time has elapsed since a previous asynchronous data replication was performed (e.g., based on the RPO settings). If, at block 404, the particular amount of time has not elapsed, process 316' may stay at block 404 until the particular amount of time has elapsed, or, in some embodiments, process 316' may complete until the particular amount of time has elapsed. In other embodiments, process 316' may not start until the particular amount of time has elapsed. If, at block 404, the particular amount of time has elapsed, then process 316' proceeds to block 406.

At block 406, empty cycle detector 117 may determine if a source volume of storage 108 contains "dirty" data (e.g., data that changed since the previous asynchronous data replication). For example, storage system 100 may determine whether one or more dirty flags or indicators are set to indicate that a given volume, or portion of a volume, of storage 108 contains changed data. If, at block 406, a volume contains dirty data, then at block 408, a new replica may be created for the volume. At block 410, the created replica may be transferred to one or more target devices (e.g., target(s) 112 of FIG. 1). At block 412, the dirty flags or indicators associated with the transferred replica are cleared, indicating that the data on the source has not changed since the replica was stored at step 410. At block 414, the asynchronous data replication cycle may be restarted (e.g., to determine the elapsed time between asynchronous replication operations in order to meet the RPO settings). In some embodiments, process 316' may proceed to block 404 to check whether an appropriate amount of time has elapsed to start a subsequent asynchronous data replication. In other embodiments, process 316' may complete and restart when an appropriate amount of time has elapsed.

If, at block 406, volumes do not contain dirty data, then at block 416, storage system 100 may determine whether a replica should be retained for the current asynchronous data replication cycle (for example, based upon the retention policy settings of system 100). If, at block 416, a replica should not be retained for the current asynchronous data replication cycle, then at block 418, the current replication cycle may complete without generating or transferring a replica (e.g., the current replication cycle is "skipped"). At block 414, the asynchronous data replication cycle may be restarted (e.g., to determine the elapsed time between asynchronous replication operations in order to meet the RPO settings). In some embodiments, process 316' may proceed to block 404 to check whether a particular amount of time has elapsed to start a subsequent asynchronous data replication. In other embodiments, process 316' may complete and restart when the particular amount of time has elapsed.

If, at block 416, a replica should be retained for the current asynchronous data replication cycle, then at block 420, a timestamp of a previous replica may be updated to a current system timestamp value. By updating the timestamp of the previous replica, the RPO and retention policy settings of the system may be met, since the previous replica is updated to indicate that it corresponds to data that was current at the time of the most recent asynchronous data replication cycle for which the retention policy required a replica to be retained. In some embodiments, process 316' may proceed to block 404 to check whether a particular amount of time has elapsed to start a subsequent asynchronous data replication. In other embodiments, process 316' may complete and restart when the particular amount of time has elapsed.

Illustrative embodiments may quickly determine whether a volume has been written since a previous replication cycle by maintaining a volume slice dirty matrix for each volume of source site 102. When data is written to a volume slice (e.g., a predetermined portion of the volume, such as one or more blocks or pages), the volume slice may be marked as dirty (e.g., modified) by setting a flag in the volume slice dirty matrix corresponding to the volume slice. Whenever a replica is created, the dirty bitmap may be transferred from a source (e.g., production) volume to one or more target volumes, and associated flags of the volume slice dirty matrix may be cleared for source volume.

As described, some embodiments may determine whether to start an asynchronous data replication cycle by checking the retention policy settings, and if a replica for the current asynchronous data replication cycle should be retained (e.g., based on the retention policy time interval setting), either a new replica is created, or a timestamp of a previous replica is updated. For example, if the volume slice dirty matrix of the source volume indicates that no data has been written to the source volume since the previous replica was created (e.g., no flags or indicators are set), and a replica should be retained for the current asynchronous data replication cycle, then the timestamp of the previous replica may be updated to reflect that the requirements of the RPO and retention policy have been met. If the volume slice dirty matrix of the source volume indicates that at least some data has been written to the source volume since the previous replica was created, then a new replica may be created and transferred to the target, and a new asynchronous data replication cycle may be started.

Figure 5:
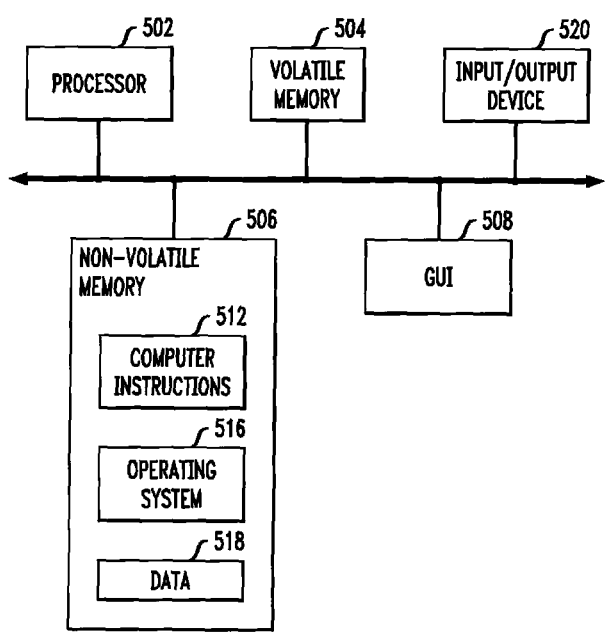
FIG. 5 is a block diagram of an example of a hardware device that may perform at least a portion of the processes shown in FIGS. 3 and 4.

Referring to FIG. 5, in some embodiments, source site 102 and/or target site 112 may be implemented as one or more computers. Computer 500 may include processor 502, volatile memory 504 (e.g., RAM), non-volatile memory 506 (e.g., a hard disk drive, solid state drive such as a flash drive, a hybrid magnetic and solid state drive, etc.), graphical user interface (GUI) 508 (e.g., a mouse, a keyboard, a display, and so forth) and input/output (I/O) device 520. Non-volatile memory 506 stores computer instructions 512, an operating system 516 and data 518 such that, for example, the computer instructions 512 are executed by the processor 502 out of volatile memory 504 to perform at least a portion of the processes 300 and 316' shown in FIGS. 3 and 4. Program code may be applied to data entered using an input device of GUI 608 or received from I/O device 620.

Processes 300 and 316' shown in FIGS. 3 and 4 are not limited to use with the hardware and software of FIG. 6 and may find applicability in any computing or processing environment and with any type of machine or set of machines that is capable of running a computer program. Processes 300 and 316' shown in FIGS. 3 and 4 may be implemented in hardware, software, or a combination of the two.

The processes described herein are not limited to the specific embodiments described. For example, processes 300 and 316' are not limited to the specific processing order shown in FIGS. 3 and 4. Rather, any of the blocks of processes 300 and 316' may be re-ordered, combined or removed, performed in parallel or in serial, as necessary, to achieve the results set forth herein.

Processor 502 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for performing data replication in a storage system, the method comprising:
    initiating a current asynchronous replication cycle at a time-based interval based upon a replication policy of the storage system, the current asynchronous replication cycle to replicate data from at least one source device that is part of the storage system to at least one target device that is part of the storage system; and
    for the current asynchronous replication cycle:
        determining whether data stored on portions of the at least one source device has changed from a previous asynchronous replication cycle based on one or more indicators associated with the data;
        when the one or more indicators indicate that the data has not changed from the previous asynchronous replication cycle and the replication policy does not require storage of a replica for the current asynchronous replication cycle if the data has not changed, updating a timestamp of a pre-existing replica of the at least one source device that is stored in the at least one target device to satisfy a Recovery Point Objective (RPO) setting of the storage system without overwriting the pre-existing replica; and
when the one or more indicators indicate that the data has not changed from the previous asynchronous replication cycle and the replication policy requires storage of a replica for the current asynchronous replication cycle if the data has not changed, generating a new replica of the at least one source device and transferring the new replica to the at least one target device,
wherein each of the indicators is associated with a different portion of the source device, and the one or more indicators are stored in a bitmap associated with the source device.

2. The method of claim 1, further comprising, after completing the current asynchronous replication cycle, starting a next asynchronous replication cycle.

3. The method of claim 1, further comprising, when the one or more indicators indicate that the data has changed from the previous asynchronous replication cycle, generating a new replica of the at least one source device and transferring the new replica to the at least one target device.

4. The method of claim 3, wherein determining whether the data has changed includes determining whether the one or more indicators are set.

5. The method of claim 4, further comprising, after transferring the new replica to at least one target device, clearing the one or more indicators.

6. The method of claim 1, wherein the source device includes at least one solid-state drive (SSD) and each portion of the source device includes a different block of the SSD.

7. A storage system comprising:
at least one target device;
at least one source device;
a processor; and
a memory storing computer program code that when executed on the processor causes the processor to execute a data replication process associated with the at least one source device and the at least one target device by performing the operations of:
initiating a current asynchronous replication cycle at a time-based interval based upon a replication policy of the storage system; and
for the current asynchronous replication cycle:
determining whether data stored on portions of the at least one source device has changed from a previous asynchronous replication cycle based on one or more indicators associated with the data;
when the one or more indicators indicate that the data from the at least one source device has not changed from the previous asynchronous replication cycle and the replication policy does not require storage of a replica for the current asynchronous replication cycle if the data has not changed, updating a timestamp of a pre-existing replica of the at least one source device that is stored in the at least one target device to satisfy a Recovery Point Objective (RPO) setting of the storage system without overwriting the pre-existing replica; and
when the one or more indicators indicate that the data from the at least one source device has not changed from the previous asynchronous replication cycle and the replication policy requires storage of a replica for the current asynchronous replication cycle if the data has not changed, generating a new replica of the at least one source device and transferring the new replica to the at least one target device,
wherein each of the indicators is associated with a different portion of the source device, and the one or more indicators are stored in a bitmap associated with the source device.

8. The system of claim 7, wherein the memory stores computer program code that when executed on the processor causes the processor to further perform the operation of, when the one or more indicators indicate that the data has changed from the previous asynchronous replication cycle, generating a new replica of the at least one source device and transferring the new replica to the at least one target device.

9. The system of claim 8, wherein determining whether the data has changed includes determining whether the one or more indicators are set.

10. The system of claim 9, wherein the memory stores computer program code that when executed on the processor causes the processor to further perform the operation of, after transferring the new replica to at least one target device, clearing the one or more indicators.

11. A computer program product including a non-transitory computer readable storage medium having computer program code encoded thereon that when executed on a processor, cause the processor to perform the operations of:
initiating a current asynchronous replication cycle at a time-based interval based upon a replication policy of a storage system, the current asynchronous replication cycle to replicate data from at least one source device that is part of the storage system to at least one target device that is part of the storage system; and
for the current asynchronous replication cycle:
determining whether data stored on portions of the at least one source device has changed from a previous asynchronous replication cycle based on one or more indicators associated with the data;
when the one or more indicators indicate that the data has not changed from the previous asynchronous replication cycle and the replication policy does not require storage of a replica for the current asynchronous replication cycle if the data has not changed, updating a timestamp of a pre-existing replica of the at least one source device that is stored in the at least one target device to satisfy a Recovery Point Objective (RPO) setting of the storage system without overwriting the pre-existing replica; and
when the one or more indicators indicate that the data has not changed from the previous asynchronous replication cycle and the replication policy requires storage of a replica for the current asynchronous replication cycle if the data has not changed, generating a new replica of the at least one source device and transferring the new replica to the at least one target device,
wherein each of the indicators is associated with a different portion of the source device, and the one or more indicators are stored in a bitmap associated with the source device.

* * * * *